Oct. 18, 1960        H. A. DE CENZO        2,956,820
FLEXIBLE PIPE COUPLING FOR BEADED CONDUITS HAVING A
PLURALITY OF PIVOTAL BACK-UP ELEMENTS
Filed July 1, 1957

INVENTOR,
HERBERT A. DE CENZO
BY
       Lyon & Lyon
ATTORNEYS

United States Patent Office 2,956,820
Patented Oct. 18, 1960

2,956,820

FLEXIBLE PIPE COUPLING FOR BEADED CONDUITS HAVING A PLURALITY OF PIVOTAL BACK-UP ELEMENTS

Herbert A. De Cenzo, Arcadia, Calif., assignor to On Mark Couplings, Inc., Los Angeles, Calif., a corporation of California Filed July 1, 1957, Ser. No. 669,013

7 Claims. (Cl. 285—105)

This invention relates to flexible couplings and included in the objects of this invention are:

First, to provide a flexible coupling which is primarily designed to join a pair of thin wall tubes having retainer beads near their ends, and to permit limited flexure and misalignment of the tubes without causing leakage from the coupling.

Second, to provide a flexible coupling which includes a seal ring and cooperating elements so arranged that angular displacement of the tube takes place about an axis substantially in the plane of the seal ring, so that upon such angular displacement the tube is not laterally or radially displaced to unduly compress one portion of the seal ring and clear the diametrically opposite side thereof and cause leakage.

Third, to provide a flexible coupling wherein the various parts may be readily slipped over the beaded ends of tubing and joined together without tools, and as easily disassembled and removed from the tubing, but will not accidentally loosen or cause leakage.

Fourth, to provide a flexible coupling wherein seal is effected by engagement with the radially inner and outer surfaces of the seal, that is, without axial force applied to the seal, so that the seal may expand axially, if caused to swell, without exerting a crushing force on the tubing.

With the above and other objects in view, as may appear hereinafter, reference is directed to the accompanying drawings in which.

Figures 1, 2:
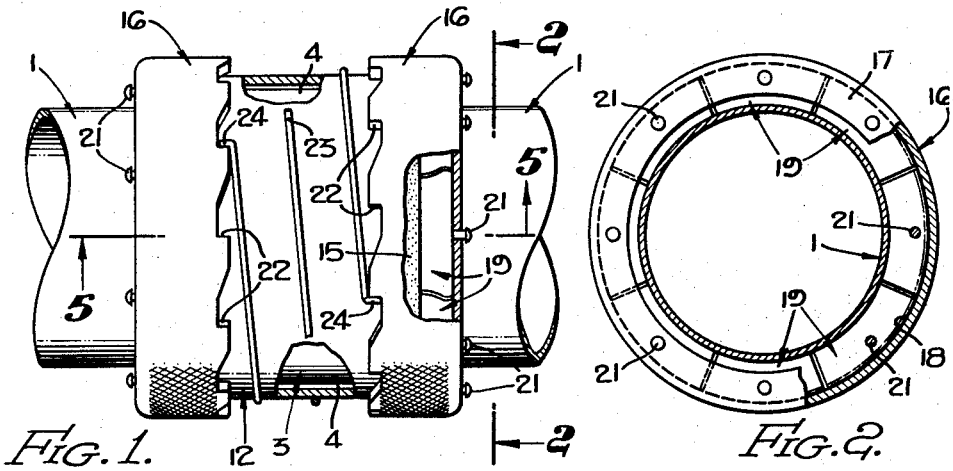
Figure 1 is a side view of the flexible coupling with a portion broken away and in section, the coupling being shown in its assembled condition, and the tubing joined by the coupling being shown fragmentarily.
Fig. 2 is a transverse sectional view through 2—2 of Fig. 1 with the coupling shown partially in elevation and partially in section.
Figures 3, 4:
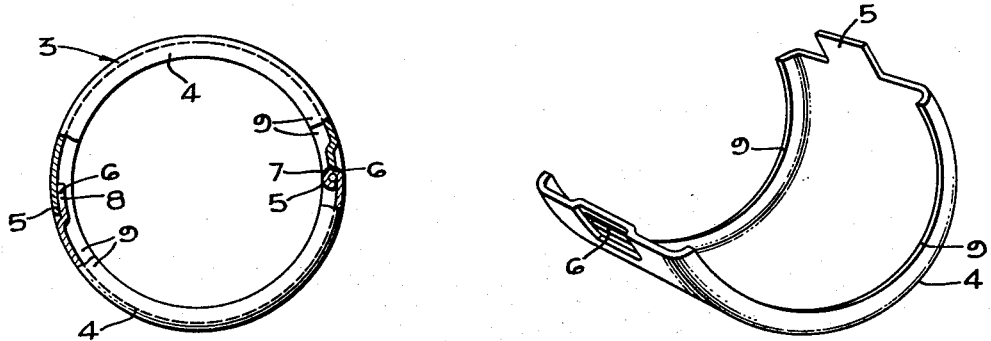
Fig. 3 is a partial end view, partial sectional view of the retainer ring.
Fig. 4 is a perspective view of one of the retainer ring sections.

The flexible coupling is intended to join confronting sections of tubing 1, such as thin wall tubing. Tubing of this type is provided adjacent each end with a rolled annular bead 2 which projects radially outwardly. In the exercise of the present invention, an annular retainer ring 3 is provided, which is formed of two complementary semicylindrical sections 4, which may be similar stampings.

One circumferential extremity of each section 4 is provided with a tang 5, and each other extremity with a radially depressed area having a slot 6. One tang is bent to form a hinge loop 7 journaling the slotted end of the other section 4. The remaining tang is provided with a latch lug or boss 8 adapted to snap into the remaining slot. Or, if desired, latch lugs 8 may be provided in the tangs of both sections 4 so that they may be separated.

The axial extremities of the retainer ring sections 4 are provided with complementary internal flanges 9. The retainer ring 3 is dimensioned to fit loosely over the beads 2 of a confronting pair of tubing sections 1. The internal flanges 9 overlap the beads radially so as to retain the tubing ends in confronting relation.

A cylindrical body member 12 fits loosely over the retainer ring 3. The body member 12 is externally screw-threaded at its axial extremities, as indicated by 13. Internally the extremities of the body member 12 are beveled, as indicated by 14.

The axial extremities of the body member 12 project beyond the ends of the retainer ring 3, and each forms with the corresponding tubing section 1 an annulus which receives a seal ring 15. Each seal ring has a thickness slightly greater than the radial distance between the tubing section and overlying end portion of the body member 12 so that the seal rings 15 afford a sealing connection therebetween.

The screw-threaded ends 13 of the body member 12 receive internally screw-threaded end rings 16. Each end ring is provided with an internal flange 17 which overlies a corresponding end of the body member 12. At the juncture of each internal flange 17 with the axial extremity of its end ring there is formed an annular fulcrum channel 18.

Loosely mounted so as to rock a limited degree within the fulcrum channel 18 of each end ring 16 is a back-up ring comprising a series of separate segments or arcuate retainer fingers 19. Each retainer finger is not only arcuate in the plane of the end ring but is also arcuate in a transverse direction, so that each retainer finger curves radially inward and axially under the corresponding end of the body member 12.

Each ring of retainer fingers 19 forms an annular abutment shoulder 20 confronting the corresponding seal ring 15. Also each retainer finger 19 is provided with a stem 21 which projects axially through a corresponding hole in the overlying internal flange 17. The extremity of each stem 21 is rivet headed so that each retainer finger 19 is loosely held in position.

The confronting axial ends of the end rings 16 are provided with a series of locking shoulders formed by teeth 22. Wrapped about the body member 12 between the end rings 16 is a spiral locking spring 23 having latch ends 24 which engage the shoulders formed by the teeth 22.

Figure 5:
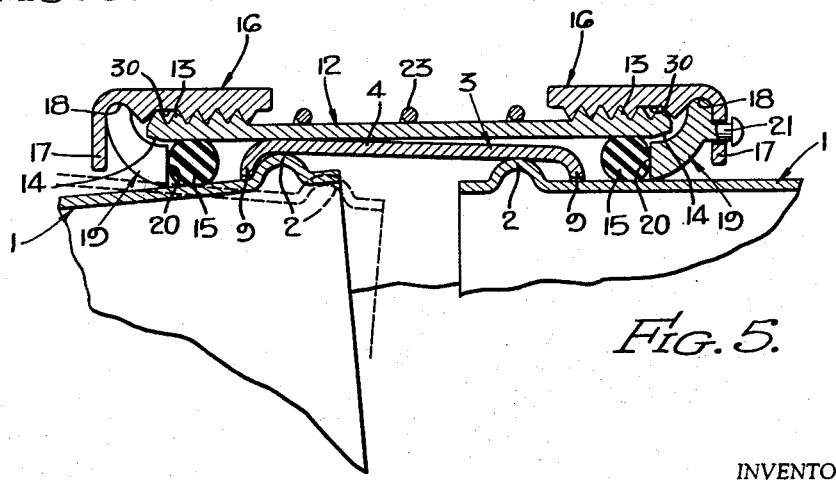
Fig. 5 is an enlarged fragmentary sectional view taken through 5—5 of Fig. 1.

The flexible coupling is assembled on a pair of confronting tubing sections 1 as follows:

The end rings 16 are slipped over the confronting ends of the tubing. It will be observed that by reason of the loose mounting of the retainer fingers 19 these fingers readily ride over the beads 2. When the retainer fingers 19 ride over the beads 2, the retainer fingers swing upward into channels or inner circumferential grooves 30 of the end rings 16, these channels or grooves providing the clearance required for the retainer fingers to swing outwardly sufficiently to pass over the beads 2. The seal rings 15 are then slipped over the ends of the tubing section and the cylindrical body member 12 is slipped over one of the tubing sections. The tubing sections are then brought into approximate alignment and the retainer ring 3 is snapped over the tubing sections. Or the retainer ring may be slipped axially onto one of the tubing sections, the tubing sections brought into alignment, and the retainer ring slipped axially over the second section. In either case, the retainer ring is positioned with its internal flanges 9 disposed in overlapping relation with the annular beads 2, substantially as shown in Fig. 5.

The cylindrical body member 12 is then centered over the retainer ring 3. The seal rings 15 are inserted partially into the ends of the body member. The end rings 16 are then screw-threaded onto the body member 12, forcing the seal rings 15 under the body member. The end rings 16 may be screw-threaded by hand and are prevented from unscrewing by engagement of the ends of the locking spring 23 with the locking teeth 22.

It will be observed that when the axis of the tubing section 1 coincides with the axis of the cylindrical body member 12, as indicated at the sectioned regions of Fig. 1, clearance exists between the retainer ring 3 and the interior of the body member 12. Also the internal flange 17 of the end ring 16 clears the tubing section 1, and the abutment shoulder-forming ends 20 of the fingers 19 are capable of radial displacement.

As a consequence, the tubing sections may pivot a limited amount relative to the coupling, and more importantly the pivotal movement may take place about an axis in the plane of the corresponding seal ring 15. By reason of the fact that the pivotal axis of the tubing lies in the plane of the corresponding seal ring and the retainer ring 3 is capable of lateral displacement, as indicated in Fig. 5, movement of the tubing does not cause one side of the ring to be unduly compressed so that leakage can occur at the opposite side. The range of pivotal movement of the tubing section is indicated by solid lines and broken lines at the left side of Fig. 5. This feature is of primary importance, for more often than otherwise the tubing sections cannot be brought into exact alignment.

It should also be observed that the tubing sections are capable of limited, relative, axial movement.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. In a coupling for interconnecting two tubing members having circumferential enlargements forming rearward shoulders near the tubing ends, including a retainer ring to bridge the ends of the two tubing members in engagement with said rearward shoulders to prevent separation of the two tubing members, said retainer ring being expansile to clear said tubing enlargements for the purpose of assembly, a coupling body to confine said retainer ring, said coupling body being made in separable sections for the purpose of assembly and having inner circumferential shoulders at its opposite ends dimensioned to clear said enlargements for the purpose of assembly, a pair of sealing rings to embrace the respective tubing members inside the coupling body adjacent the opposite ends of the retainer ring, said sealing rings being expansile to clear the tubing enlargements for the purpose of assembly, and a pair of back-up rings for said sealing rings in engagement with the inner circumferential shoulders respectively of the coupling body, the improvement comprising: said coupling body comprising a central body member and two end rings screw-threaded onto said central body member; and in which each of said back-up rings is formed by a plurality of discrete segments, said segments extending radially outward beyond the ends of said central body member into pivotal engagement with said end rings and extending inward into the ends of said central body member for abutment against said sealing rings.

2. The improvement as set forth in claim 1 in which each of said end rings is formed with an inner circumferential channel of curved cross section; and in which the segments of the back-up rings have curved outer ends pivotally seated in said channel.

3. In a coupling for interconnecting two tubing members having circumferential enlargements forming rearward shoulders near the tubing ends, including a retainer ring to bridge the ends of the two tubing members in engagement with said rearward shoulders to prevent separation of the two tubing members, said retainer ring being expansile to clear said tubing enlargements for the purpose of assembly, a coupling body to confine said retainer ring, said coupling body being made in separable sections for the purpose of assembly and having inner circumferential shoulders at its opposite ends dimensioned to clear said enlargements for the purpose of assembly, a pair of sealing rings to embrace the respective tubing members inside the coupling body adjacent the opposite ends of the retainer ring, said sealing rings being expansile to clear the tubing enlargements for the purpose of assembly, and a pair of back-up rings for said sealing rings in engagement with the inner circumferential shoulders respectively of the coupling body, the improvement comprising: each of said back-up rings being formed by a plurality of discrete segments, said segments having outer end portions in pivotal engagement with said coupling body to permit the segments to swing between radially outward positions to clear the tubing enlargements for the purpose of assembly and radially inward positions to back up said sealing rings, each of said segments having a second portion loosely connected with said coupling body to keep the segments from becoming separated from the coupling body prior to installation of the coupling.

4. The improvement set forth in claim 3 in which the loose connection between each segment and the coupling body comprises a headed portion of the segment extending loosely through an aperture in the coupling body.

5. In a coupling for interconnecting two tubing members having circumferential enlargements forming rearward shoulders near the tubing ends, including a retainer ring to bridge the ends of the two tubing members in engagement with said rearward shoulders to prevent separation of the two tubing members, said retainer ring being expansile to clear said tubing enlargements for the purpose of assembly, a coupling body to confine said retainer ring, said coupling body being made in separable sections for the purpose of assembly and having inner circumferential shoulders at its opposite ends dimensioned to clear said enlargements for the purpose of assembly, a pair of sealing rings to embrace the respective tubing members inside the coupling body adjacent the opposite ends of the retainer ring, said sealing rings being expansile to clear the tubing enlargements for the purpose of assembly, and a pair of back-up rings for said sealing rings in engagement with the inner circumferential shoulders respectively of the coupling body, the improvement comprising: each of said back-up rings being formed by a plurality of segments, said segments being in pivotal engagement with said coupling body to permit the segments to swing between radially outward positions to clear the tubing enlargements for the purpose of assembly and radially inward positions to back up said sealing rings.

6. In a coupling for interconnecting two tubing members having circumferential enlargements forming rearward shoulders near the tubing ends, including a retainer ring to bridge the ends of the two tubing members with inner circumferential shoulders of the retainer ring in engagement with said rearward shoulders to prevent separation of the two tubing members, said retainer ring being expansile to clear said tubing enlargements for the purpose of assembly, a coupling body to confine said retainer ring, said coupling body being made in separable sections for the purpose of assembly and having inner circumferential shoulders at its opposite ends dimensioned to clear said enlargements for the purpose of assembly, a pair of sealing rings to embrace the respective tubing members inside the coupling body adjacent the opposite ends of the retainer ring, said sealing rings being expansile to clear the tubing enlargements for the purpose of assembly, and a pair of back-up rings for said sealing rings in engagement with the inner circumferential shoulders respectively of the coupling body, the improvement comprising: said coupling body having two inner circumferential bearing channels for cooperation with said back-up rings respectively; and each of said back-up rings being formed by a plurality of segments, the axially outward ends of said segments being in pivotal engagement with said bearing channels for swinging movement of the segments between radially outward positions to clear the tubing enlargements for the purpose of assembly and radially inward positions to back-up said sealing rings.

7. The improvement as set forth in claim 6 in which said coupling body is internally dimensioned to provide clearance to receive the swinging ends of said segments when said segments swing outward to clear said enlargements of the tubing members.

References Cited in the file of this patent

UNITED STATES PATENTS

| | | |
|---|---|---|
| 406,561 | Buchanan | July 9, 1889 |
| 915,956 | Hazlet | Mar. 23, 1909 |
| 1,440,207 | Burns | Dec. 26, 1922 |
| 1,926,422 | Ambruster | Sept. 12, 1933 |
| 2,355,166 | Johanson | Aug. 8, 1944 |
| 2,497,441 | Detweiler | Feb. 14, 1950 |
| 2,778,661 | Leighton | Jan. 22, 1957 |
| 2,781,207 | Detweiler et al. | Feb. 12, 1957 |
| 2,826,437 | Detweiler | Mar. 11, 1958 |

FOREIGN PATENTS

| | | |
|---|---|---|
| 253,581 | Great Britain | June 16, 1926 |